United States Patent [19]
Strom

[11] Patent Number: 4,785,161
[45] Date of Patent: Nov. 15, 1988

[54] LASER MACHINING FOR PRODUCING VERY SMALL PARTS

[75] Inventor: Richard A. Strom, Eagan, Minn.

[73] Assignee: Control Data Corporation, Minneapolis, Minn.

[21] Appl. No.: 910,593

[22] Filed: Sep. 23, 1986

Related U.S. Application Data

[63] Continuation-in-part of Ser. No. 888,605, Jul. 21, 1986, abandoned.

[51] Int. Cl.$^4$ .............................................. B23K 26/00
[52] U.S. Cl. ............................. 219/121.69; 219/121.8
[58] Field of Search ................. 219/121 LH, 121 LJ, 219/121 LN; 360/121, 119, 125; 29/603

[56] References Cited

U.S. PATENT DOCUMENTS

| | | | |
|---|---|---|---|
| 4,017,665 | 4/1977 | Brutsch et al. | 219/121 LM X |
| 4,046,986 | 9/1977 | Barker | 219/121 LM |
| 4,301,353 | 11/1981 | Suenaga et al. | 219/121 LJ |
| 4,329,564 | 5/1982 | Hazelton et al. | 219/121 LJ |
| 4,475,135 | 10/1984 | Warner et al. | 360/103 |
| 4,520,261 | 5/1985 | Tsutsumi | 250/203 R |
| 4,521,667 | 6/1985 | Sachs | 219/121 LJ |
| 4,543,464 | 9/1985 | Takeuchi | 219/121 LH |

*Primary Examiner*—C. L. Albritton
*Attorney, Agent, or Firm*—Joseph A. Genovese; Michael B. Atlass

[57] ABSTRACT

This invention teaches a method for producing small machined parts by laser including a description of how to avoid sensitive edges of the work piece being machined and how to control beam size for maintaining uniform cavity depth over a relatively long work piece and also how to generate non-uniform cavity depth profiles on the surface of one or more parts. The invention also teaches that such a process can be used to produce satisfactory negative pressure air bearing sliders which are used to support the transducing magnetic heads for high density magnetic storage disk drives.

14 Claims, 2 Drawing Sheets

LASER MACHINING FOR PRODUCING VERY SMALL PARTS

This application is a continuation in part of the invention of U.S. patent application Ser. No. 888,605, filed July 21, 1986, now abandoned.

This invention relates to the field of cutting or machining of very small parts and is particularly suitable for machining the carrying assembly or "slider" for transducing heads of the type used for reading and writing high density information on or from magnetic media surfaces. At any point in this specification where machining is mentioned it refers to the process of cutting, etching, scoring, or milling, etc. by a laser beam to produce precision depth and definition of a cavity.

BACKGROUND

Certain problems are inherent in the machining of small parts to be used in environments where a very small tolerance is available with respect to the surface characteristics of those parts. Referencing in particular the specific application for which this invention was developed, transducing heads for high density magnetic disk drives in data storage units are required to fly very close (about 10-15 microinches) to the magnetic surface in order for the disk drive to function properly. To close, and the head and slider will crash into the surface of the disk causing loss of data, damage to the substrate and potentially a damaged head, too far from the surface and the accuracy of the read/write capabilities of the head become diminished to the point of non-functionality. The disks which are coated with a magnetic media are rotating typically at a speed of 3600 rpm while the heads are reading or writing. A typical magnetic air-bearing slider containing transducing heads is described in U.S. Pat. No. 3,855,625 issued to Gariner et al. Methods for machining such air bearing sliders with a laser are described in U.S. Pat. No. 4,301,353, Swenaga, et al.

One problem overcome by this invention is peculiar to the construction of thin film head sliders. On the trailing edge of the slider are transducing heads and relatively large metal leads to these heads and contacts which are produced on the flyers by a thin film technique. Thin film deposition of these elements allows for the construction of very high precision and very small heads. These elements are overlaid with an oxide layer to prevent corrosion and to maintain long functional lives as well as to prevent mechanical damage. As the laser is used to machine the end or trailing edge of the slider, it comes into proximity with these heads and lead structures. This can result in severe damage to or loss of one or more of the transducing heads at the trailing edge of the slider in the extreme case, or undetectable loss of the protective oxide coating in less extreme cases.

Another problem encountered in laser machining of sliders is the need for tight control of the pattern cavity depth. Conventional laser cutting and machining systems employ a laser which is fairly large and a set of movable optics for controlling the position of the beam that does the machining or cutting. Due to this arrangement, if an identical pattern of cuts are to be made on a series of pieces lined up in a row (or a continuous "bar"), as the optical assembly is moved from one end of the row to the other, the beam path length is increased or decreased and this changes the size of the beam as it is focused on the surface of the part. The change in beam size causes a change in the resulting cavity depth of the pattern being machined with affects in the case of the slider the flying height. Where the sliders are constructed from a single bar and the beam size changes significantly from one end of the bar to the other, the cavity depth of the sliders at one end of the bar will be significantly different from that of the sliders on the other end of the bar.

For the purposes of this application focus is defined as that distance from the objective or focusing lens of the optical system at which the laser beam is at its narrowest waist. For the purpose of this definition, the focusing or objective lens is considered to be a converging lens or lens system.

SUMMARY OF THE INVENTION

This invention teaches an improved method for laser machining very small parts including a method for avoiding damage to sensitive areas on a side of the part being machined, and a method for adjusting the depth profile of the machined surface and a method whereby the overall depth of the machined surface of a series of parts may be maintained to provide a uniform quality (depth) profile across the entire length of the work piece comprised of a row of parts to be machined. The first technique in this improved method for machining very small parts provides that the bar or work piece be tilted at an appropriate angle so that the sensitive structures which may exist along one side of the bar or work piece are not subject to damage. In the case of the transducer bearing slider bar all the transducers are lined up along one side of the bar and the bar is tilted toward the transducers at such an angle so that the cutting provided by the laser at that edge of the bar cannot reach the transducer or the associated structures. It is disclosed that if the entire part (in the preferred embodiment, slider) is machined at this angle, a non-uniform cavity depth profile was generated which may for certain purposes be useful. At all times an appropriate turning on and off timing of the laser pulse train may be employed to overcome non-uniform speed of the beam directing mechanism.

This invention further improves the laser machining process by teaching that a bar of work piece may be tilted at an angle to compensate for laser beam spreading over the length of the work piece and thus to provide a uniform depth of machining (cavity depth) at each end of the bar being machined. Where this second angle is in a plane perpendicular to the angle used for edge protection, both of these methods may be applied simultaneously.

DETIALED DESCRIPTION OF THE PREFERRED EMBODIMENT

The concepts and features of the methods and apparatus described in this patent may be applied to various work pieces comprises of various small parts as would be obvious to one of ordinary skill in the art. The preferred embodiment has been developed by its application to sliders composed of ferrite, Aluminum oxide/titanium carbide ceramic, aluminum oxide, silicon, and parts made of calcium titanate and barium titanate have been used and various other ceramics may be employed as well. Tungsten carbide has been tested, and a depth using the same laser parameters (pulse rate, pulse number per unit length, total power, size of focus beam, degree of focus) has yielded an approximate one-third depth of that achieved in ferrite using the same laser machining strength characteristics. It should be known to one in the art that factors such as reflectivity, bonding strength, etc., will require one to alter the laser machining parameters to achieve appropriate depths.

Figure 1:
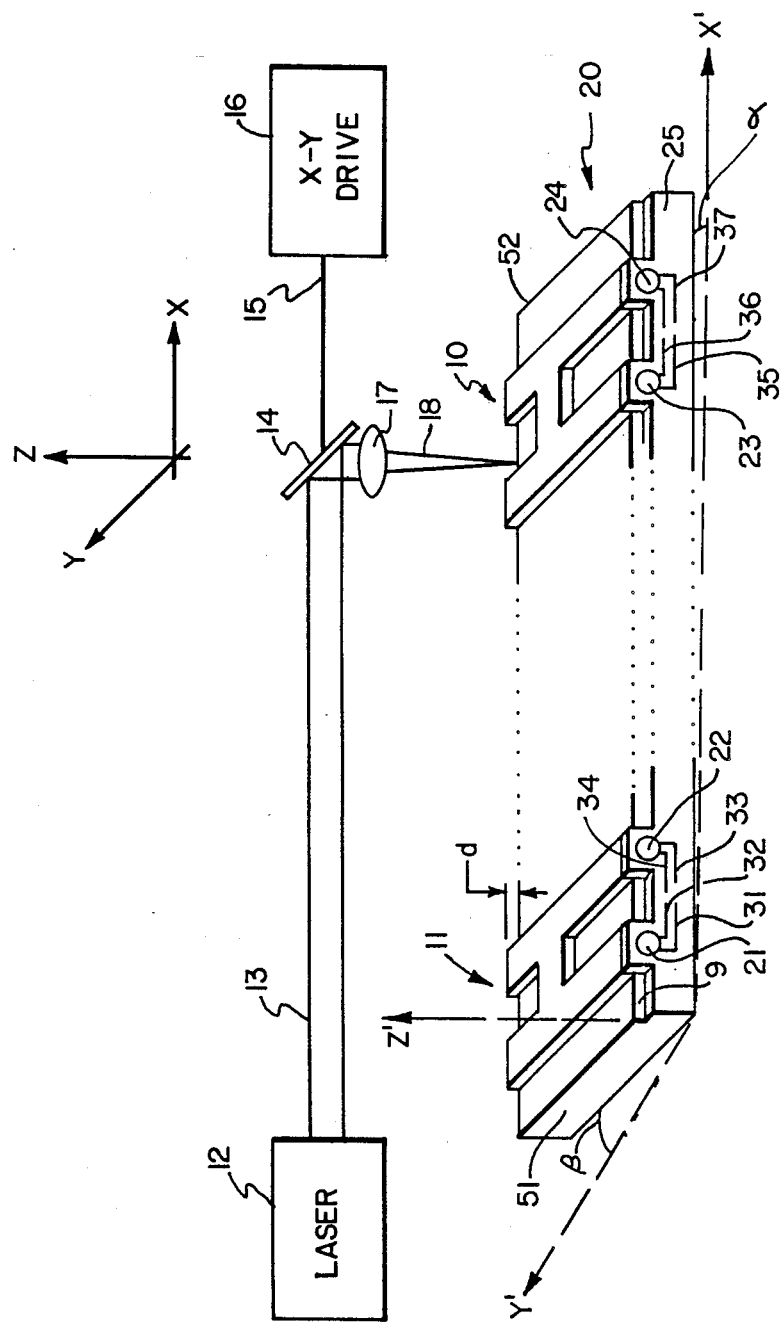
FIG. 1 illustrates in a functional way the application of an angle alpha and an angle Beta to a work piece operated on by a laser machining device, and the relationship between the laser machining device and said work piece to illustrate the application of the laser beam to the work piece.

FIG. 1 illustrates the method and arrangement employed by this invention for laser machining of the preferred embodiment parts. Individual air bearing patterns are illustrated on the surface of the rectangular bar or work piece 20 and referred to with the numerals 10 and 11. For purposes of illustration only, one part from each end of the bar is illustrated. It should be noted that in the preferred embodiment the patterns will line up to each other along the surface of the bar which will later be cut between patterns, forming individual sliders by slicing along planes parallel to y'-z'. Two 3-dimensional coordinate systems are used to illustrate the positioning employed by this invention, x, y, z and x', y', z'. A laser 12 generates a beam 13 in a plane parallel to the x-y plane. Through a set of optics (not shown) the beam is delivered to a mirror 14 which is pushed and pulled to move the beam along axes parallel to the x and y axes. The x-y drive 16 and connection to the mirror 15 provide the physical capability to do so. (Of course, other optical delivery systems which deliver a beam perpendicularly to the x-y plane may be used.) Because several trade items are available to one or ordinary skill in the art, which are capable of providing for the movement of the laser beam in the pattern described, it is believed that no more specificity is required with respect to such description. Further, it should be sufficient to state that microcomputer control of the x-y drive mechanism(s) is also well-known to those in the art, and though it is used to generate specific patterns, it is believed by this inventor to be sufficient to state that such is the case without further description. Note that due to the time required by the x-y drive system to reach a constant speed one must wait to turn the laser on until such constant speed is achieved. In the preferred embodiment this requires about a 0.005 inch span before any line is cut, otherwise the depth of that line will not be constant.

It should be noted that an objective lens 17 (also known as a focusing lens) is used to converge the laser beam to a fine point of focus on the surface of the part being machined. As was previously practiced in laser machining of small parts, the parts were mounted so that the upper surface (and parallel lower surface) rested during the machining process in a plane parallel to the x, y plane. For the purposes of illustration, this plane (for the lower surface) is designated in FIG. 1, the x', y' plane. It should be noted that the bar 20 is illustrated showing only the two ends of the bar with the dotted line break in the middle although it should be understood that the bar is one continuous piece. Finally, it should be noted that the axis of the part 18 of the beam directed to the bar is parallel to the z and z' axes.

In the preferred embodiment it is believed that the width of the beam impinging on the surface of the bar at the point of focus is approximately 0.002 inches in width and because of the high energy density at that point, is capable of removing material from the surface of the part by a process which appears to be vaporization. By driving the laser under micro processor control through the x-y drive 16, the beam 18 scans over the part in overlapping pathes of geometric shapes which, when the part is laid flat in the x', y' plane, are uniform cavities approximately 10 $\mu$m deep. The shapes provided by the preferred embodiment are "H" shaped which make up the "rails" and "cross-bar" of the air bearing surface of the negative pressure air bearing (NPAB) slider which is the type of part this invention was first developed for application to. The basic machining process for each slider is stepped and repeated many times by the x-y drive system under microprocessor control as the beam is moved appropriately by said control from one end of the bar to the other. In the preferred embodiment, the bar is of a ceramic type material appropriate to the construction of air bearing sliders. Prior to the machining of the air bearing surface, magnetic transducers 21, 22, 23 and 24 have been fabricated (in the preferred embodiment by thin film technique) along the side 25 of the bar. When built into a magnetic disk drive, these heads will be located at the back of the slider. They are positioned so that they will be at the surface and the edge which flies closest to the magnetic disk.

Figure 2:
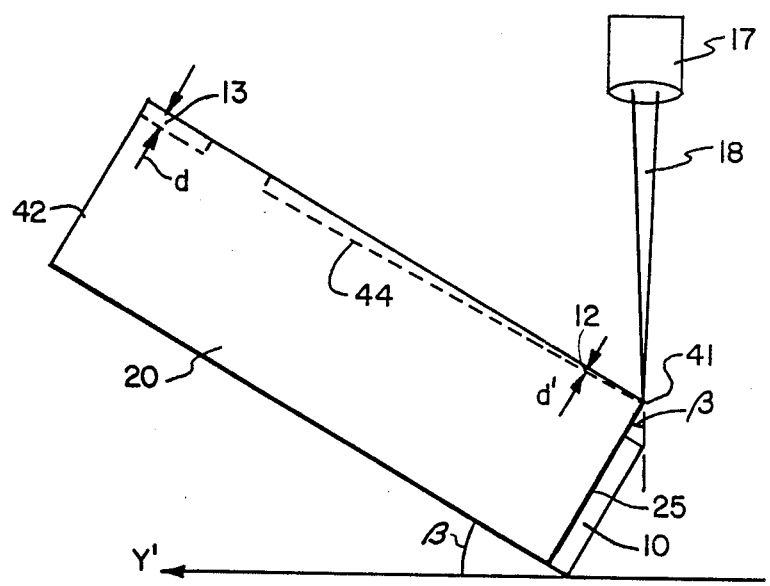
FIG. 2 illustrates in detail how the angle Beta is employed by this invention.

A problem encountered when laser machining is used to cut the air bearing pattern adjacent to the transducers, is that these transducers, or more particularly their coverings, may be damaged by the machining beam. Transducers and the leads to them 31, 32, 33 and 34 have an oxide deposited over them to prevent damage during assembly and or use. The laser damage can be minimized if the transducer structure is not present in one of the areas being machined. Hence, when plating or depositing the material on the side 25 of the bar 20 to produce the transducing structures, areas such as area 9 should not be plated or deposited or should be removed before the laser machining or machining process begin. To further reduce the possibility of transducer structure damage, the method detailed in FIG. 2 should be employed. Note that the laser beam 18 at the point of focus 41 makes an angle Beta with side 25 of bar 20. This angle Beta is equivalent to the angle Beta between the bars under surface and the x', y' plane. (Note that the x' axis is perpendicular to the plane of the paper on which FIG. 2 is drawn). In the preferred embodiment, the angle Beta is about 14 degrees, being chosen so that the sensitive transducer areas will be shielded by the bar edge at the point of focus 41.

Tipping the bar in this manner can be used in two different ways. The entire air bearing pattern (i.e., the machined surface which provides for a raised "H" shaped flying surface) can be cut in the single step process with the bar in the tipped orientation. However, it should be noted that if where this is done the cavity depth profile is not constant from side 25 to side 42 of the bar. This is expressed as a measure d at one side and d' at the other in FIG. 2 and dotted line 44. In the case where the part being machined is a negative pressure air bearing slider, this cavity depth profile will affect the flying height or the flying characteristics of the slider when it is mounted into the disk drive. Such cavity depth slopes may be employed to the advantage of the user who requires a changing cavity depth profile rather than a uniform cavity depth. It is believed that the reason for the change in cavity depth is that the beam does not remain in focus for the entire surface from side 25 to side 42. Thus, the cavity depth is greater wherever the size or width of the impinging beam is greater. The beam size is greater when it is out of focus. Due to the tilt introduced by angle Beta the surface is in focus at 41 and becomes gradually out of focus as the beam moves toward edge 42. Varying Beta as well as varying the point at which the beam is in focus on the surface of the part will obviously vary the cavity depth profile. This depth-focus relationship is true near the point of focus of the laser beam 18 and would obviously not be true at some point far past the focus where the divurgence of the laser beam is so great that the energy is no longer concentrated enough to provide for adequate machining. Obviously, the characteristics of the material being machined may vary the relationship between the focus of the beam and the depth of the material provided all other variables are held constant. It is possible that with some materials a non-linear relationship can be shown, but experiments have not shown that to date.

It should be noted that if the angle Beta is constant and the surface is flat throughout the length of the bar, whatever the cavity profile is on the first part at one end (say 51) of the bar, that same cavity profile will be repeated on the part at the other end (52) of the bar. (The second angle introduced into the machining process by this invention will describe how to keep both the cavity depth and the cavity depth profile constant).

It is worth noting, that if the focus of the lens is subject to microprocessor control, a change in the cavity depth profile may be accomplished such that the depth variation may be controlled at any point along the surface being machined. Thus, very complicated cavity depth profiles may be generated using such a variable focus technique to impart various shapes into the surface being machined including, but not limited to, aerodynamicly more stable flying surfaces. Likewise, other laser machining parameters (speed of beam movement, intensity, pulse duration, etc.) may be varied over the machined surface to produce profiles of varying slopes.

Tipping the bar to eliminate transducer damage can be used in a different way, if a constant cavity depth, is desired. The air bearing machined pattern is cut in a two-step process. The major portion of the pattern, excluding a vary small area near the transducers is cut with Beta equal to 0 degrees. Then the bar may be tipped so that the transducers are protected as is shown in FIG. 2 and the remaining small area may then be cut. (Of course, it is possible that the rear area could cut first, however, it has been found that it is very easy to cut a very small edge with just one pass of the laser across the bar and it is believed that production of small parts from the bar will be increased with the aforedescribed order of cutting).

Both the single and two-step processes employing the angle Beta can yield air bearing sliders that have acceptable characteristics. The previously referenced U.S. Pat. No. 3,855,625 mentions air bearing designs with a constant cavity depth, and also a design with a tapered cavity.

Although the cavity depth can vary from the leading edge to the trailing edge of an air bearing slider, it is important in production to have the cavity depth profile and the magnitude of that profile for each slider be the same because the flying height of the resulting slider is strongly influenced by cavity depth. Since a bar 20 contains several adjacent sliders (in practice, from 10–15) in a line parallel to the x, z plane, it is therefore, important that the laser machining parameters that affect cavity depth be tightly controlled along this axis.

In the prior art, the bar surface is precisely aligned to be in focus and co-planar with the plane of motion of the optical system meaning the x, y plane. For the beam positioning method shown in FIG. 1, the cavity depth decreases as the laser machining proceeds from one sider to the next along the x direction. This positional change is approximately 5 percent over the course of a two-inch long bar. The change in cavity depth correlates with the change in beam size. This change in beam size may be explained by noting that the laser beam 13 changes length between the output of the laser and the focusing lens 17 as the x-y drive 16 moves the optics. The natural divurgence of laser beams causes the beam size to change as it enters the focusing lens 17. This results in change of beam size at the surface of the bar 20. It is believed that a more divergent beam reaching focusing lens 17 results in a smaller beam size at the point of focus. [Here it is assumed that lens 17 has a constant focal distance.]

In the method of this invention, the beam size positional dependence is virtually eliminated by introducing a beam size compensating adjustment. This is accomplished by rotating the bar by a very small angle alpha from the x', z' plane as is shown in FIG. 1. The angle alpha is approximately 0.4 degrees in the preferred embodiment using a ferrite substrate for NPAB sliders. The actual angle for a given system can be determined empirically by measuring using a profilometer and minimizing the positional dependence of cavity depth. The use of a small angle alpha causes the beam to become slightly out of focus as the laser beam is positioned along the direction of the x' axis. Since an out-of-focus beam is larger, this can be used to compensate the beam size change caused by the greater beam divergence as beam 13 gets longer. The edge cut improvement controlled by angle Beta and the beam size compensation controlled by angle alpha are completely independent effects because alpha and Beta lie in orthogonal planes, and thus, both adjustments may be used together to produce finely machined very small parts.

What is claimed is:

1. A method for machining at least one small part (having an axis) including machining at least one surface with a laser beam delivered to said surface for impingement in a series of spots adjacent to one another in a linear pattern to form a line by optical means which is moveable in a predetermined pattern such that the movement of the beam from one end to the other along said axis would without adjustment cause a non-uniform cavity depth of said part along the axis to be machined, wherein the method comprises:

positioning said part axis at an adjustment angle which is other than 90° relative to a line parallel to the impinging beam axis, such angle being sufficient to compensate for said non-uniformity in cavity depth.

2. A method for producing very small parts as set forth in claim 1 wherein said part is comprised of at least one slider.

3. A method for laser machining of sliders with thin film transducing heads wherein the plane of the side of the part being machined containing the heads is tilted at an angle to the laser beam axis sufficient to provide a protective ledge for said heads from said beam when said beam machines the surface adjacent the side on which said heads are located.

4. A method for laser machining of small parts with sensitive structures located on one side of the parts, wherein the plane of the side of the part being machined having the sensitive structure is positioned at an angle to the machining beam sufficient such that the part sheilds the sensitive structure.

5. A method for laser machining of small parts as set forth in claim 4, wherein the area of the surface being machined which is nearest the side having the sensitive structure is machined first, then the rest of the surface is machined.

6. A method for laser machining of small parts as set forth in claim 4, wherein the area of the surface being machined which is nearest the side having the sensitive structure is machined after the rest of the surface is machined.

7. A method for laser machining small parts in which the angle of the surface of said part to be machined relative to the impinging laser beam axis is varied to control the depth of the machined cavity.

8. A method as set forth in claim 7 including holding the angle constant at other than 90° to achieve a cavity depth profile, or at 90° to achieve a flat cavity depth.

9. A method for laser machining small parts as set forth in claim 1 in which an angle orthogonal to the angle of claim 2 of the side of the part being machined of said part to be machined relative to the impinging laser beam is varied to control the depth of the machined cavity.

10. A method for laser machining small parts as set forth in claim 3 in which the angle of the side of the part being machined of said part to be machined relative to the impinging laser beam is varied to control the depth of the machined cavity.

11. A method for laser machining small parts as set forth in claim 4 in which the angle of the side of the part being machined of said part to be machined relative to the impinging laser beam is varied to control the depth of the machined cavity.

12. A method for laser machining small parts as set forth in claim 5 in which the angle of the side of the part being machined of said part to be machined relative to the impinging laser beam is varied to control the depth of the machined cavity.

13. A method for laser machining small parts as set forth in claim 6 in which the angle of the surface of said part to be machined relative to the impinging laser beam is varied to control the depth of the machined cavity.

14. A method for laser machining small parts as set forth in claim 4 including holding the angle constant at other than 90° to achieve a cavity depth profile or at 90° to achieve a flat cavity depth.

* * * * *